(12) United States Patent
Yonge, III et al.

(10) Patent No.: US 9,148,385 B2
(45) Date of Patent: *Sep. 29, 2015

(54) CONTENTION GROUPS FOR HIDDEN NODES

(71) Applicant: QUALCOMM Incorporated, San Diego, CA (US)

(72) Inventors: Lawrence Winston Yonge, III, Summerfield, FL (US); Srinivas Katar, Gainesville, FL (US); Manjunath Anandarama Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,394

(22) Filed: Jun. 13, 2013

(65) Prior Publication Data

US 2013/0272315 A1    Oct. 17, 2013

Related U.S. Application Data

(63) Continuation of application No. 12/133,315, filed on Jun. 4, 2008, now Pat. No. 8,488,615.

(60) Provisional application No. 60/941,949, filed on Jun. 4, 2007.

(51) Int. Cl.
*H04L 12/915* (2013.01)
*H04L 12/28* (2006.01)
(Continued)

(52) U.S. Cl.
CPC .......... *H04L 47/787* (2013.01); *H04L 12/2801* (2013.01); *H04L 12/413* (2013.01); *H04L 45/12* (2013.01); *H04L 45/121* (2013.01); *H04L 45/122* (2013.01); *H04L 45/123* (2013.01); *H04L 45/125* (2013.01); *H04L 45/16* (2013.01);
(Continued)

(58) Field of Classification Search
None
See application file for complete search history.

(56) References Cited

U.S. PATENT DOCUMENTS

| 4,578,530 A | 3/1986 | Zeidler |
| 4,689,786 A | 8/1987 | Sidhu et al. |

(Continued)

FOREIGN PATENT DOCUMENTS

| EP | 1748574 | 1/2007 |
| EP | 1748597 A1 | 1/2007 |

(Continued)

OTHER PUBLICATIONS

U.S. Appl. No. 11/970,339 Final Office Action, Jan. 3, 2014, 27 pages.

(Continued)

*Primary Examiner* — Ayaz Sheikh
*Assistant Examiner* — Peter Chau
(74) *Attorney, Agent, or Firm* — DeLizio Law, PLLC

(57) ABSTRACT

Communicating among stations in a network includes, from each of multiple stations in the network, transmitting information indicating which other stations from which that station is able to reliably receive transmissions. A schedule for communicating among the stations is determined based on the information from the stations and transmitting the schedule over the network. The schedule includes a plurality of time slots during which respective contention groups of stations are assigned to communicate using a contention-based protocol.

30 Claims, 9 Drawing Sheets

(51) Int. Cl.
  *H04L 12/721* (2013.01)
  *H04L 12/727* (2013.01)
  *H04L 12/733* (2013.01)
  *H04L 12/729* (2013.01)
  *H04L 12/761* (2013.01)
  *H04L 12/413* (2006.01)
  *H04L 12/44* (2006.01)

(52) U.S. Cl.
  CPC ..... *H04B 2203/5445* (2013.01); *H04L 12/2856* (2013.01); *H04L 12/44* (2013.01)

(56) References Cited

U.S. PATENT DOCUMENTS

| | | |
|---|---|---|
| 4,807,248 A | 2/1989 | Pyatt et al. |
| 5,328,530 A | 7/1994 | Semiatin et al. |
| 5,359,625 A | 10/1994 | Vander Mey et al. |
| 5,491,750 A | 2/1996 | Bellare et al. |
| 5,570,355 A | 10/1996 | Dail et al. |
| 5,613,012 A | 3/1997 | Hoffman et al. |
| 5,617,421 A | 4/1997 | Chin et al. |
| 5,682,428 A | 10/1997 | Johnson |
| 5,732,076 A | 3/1998 | Ketseoglou et al. |
| 6,074,086 A | 6/2000 | Yonge, III |
| 6,111,919 A | 8/2000 | Yonge, III |
| 6,141,355 A | 10/2000 | Palmer et al. |
| 6,167,137 A | 12/2000 | Marino et al. |
| 6,173,400 B1 | 1/2001 | Perlman et al. |
| 6,185,185 B1 | 2/2001 | Bass et al. |
| 6,188,690 B1 | 2/2001 | Holden et al. |
| 6,189,040 B1 | 2/2001 | Oohara |
| 6,201,794 B1 | 3/2001 | Stewart et al. |
| 6,243,761 B1 | 6/2001 | Mogul et al. |
| 6,269,132 B1 | 7/2001 | Yonge, III |
| 6,269,163 B1 | 7/2001 | Rivest et al. |
| 6,272,135 B1 | 8/2001 | Nakatsugawa |
| 6,278,685 B1 | 8/2001 | Yonge, III |
| 6,307,940 B1 | 10/2001 | Yamamoto et al. |
| 6,310,892 B1 | 10/2001 | Olkin |
| 6,388,995 B1 | 5/2002 | Gai et al. |
| 6,519,231 B1 | 2/2003 | Ding et al. |
| 6,574,195 B2 | 6/2003 | Roberts |
| 6,591,364 B1 | 7/2003 | Patel |
| 6,606,303 B1 | 8/2003 | Hassel et al. |
| 6,631,136 B1 | 10/2003 | Chowdhury et al. |
| 6,711,163 B1 | 3/2004 | Reid et al. |
| 6,775,656 B1 | 8/2004 | Gettwart et al. |
| 6,804,252 B1 | 10/2004 | Johnson |
| 6,904,462 B1 | 6/2005 | Sinha |
| 6,910,136 B1 | 6/2005 | Wasserman et al. |
| 7,039,021 B1 | 5/2006 | Kokudo |
| 7,065,643 B1 | 6/2006 | Cornils et al. |
| 7,085,284 B1 | 8/2006 | Negus |
| 7,089,298 B2 | 8/2006 | Nyman et al. |
| 7,181,620 B1 | 2/2007 | Hur |
| 7,234,058 B1 | 6/2007 | Baugher et al. |
| 7,346,021 B2 | 3/2008 | Yoshizawa et al. |
| 7,350,076 B1 | 3/2008 | Young et al. |
| 7,352,770 B1 | 4/2008 | Yonge, III |
| 7,369,579 B2 | 5/2008 | Logvinov et al. |
| 7,395,097 B2 | 7/2008 | Perdomo et al. |
| 7,409,543 B1 | 8/2008 | Bjorn |
| 7,496,039 B2 | 2/2009 | Yamada et al. |
| 7,506,042 B2 | 3/2009 | Ayyagari |
| 7,558,294 B2 | 7/2009 | Yonge, III |
| 7,558,575 B2 | 7/2009 | Losh et al. |
| 7,573,891 B1 | 8/2009 | Chow et al. |
| 7,609,681 B2 | 10/2009 | Kurobe et al. |
| 7,623,542 B2 | 11/2009 | Yonge et al. |
| 7,668,191 B2 | 2/2010 | Steinback et al. |
| 7,684,333 B1* | 3/2010 | Dasylva et al. ............ 370/235.1 |
| 7,756,039 B2 | 7/2010 | Yonge, III |
| 7,797,751 B1 | 9/2010 | Hughes et al. |
| 7,804,842 B2 | 9/2010 | Malik et al. |
| 7,826,475 B2 | 11/2010 | Lee et al. |
| 7,826,618 B2 | 11/2010 | Klingler et al. |
| 7,894,487 B2 | 2/2011 | Yonge, III |
| 7,949,356 B2 | 5/2011 | Yonge, III |
| 7,961,694 B1 | 6/2011 | Chan et al. |
| 8,112,358 B2 | 2/2012 | Yonge, III |
| 8,170,051 B2 | 5/2012 | Yonge, III |
| 8,429,406 B2 | 4/2013 | Yonge, III |
| 8,467,369 B2 | 6/2013 | Yonge, III |
| 8,488,615 B2 | 7/2013 | Yonge, III et al. |
| 8,503,480 B2 | 8/2013 | Yonge, III et al. |
| 8,510,470 B2 | 8/2013 | Yonge, III et al. |
| 8,930,572 B2 | 1/2015 | Yonge, III et al. |
| 8,989,379 B2 | 3/2015 | Katar et al. |
| 2001/0000709 A1 | 5/2001 | Takahashi et al. |
| 2002/0015496 A1 | 2/2002 | Weaver et al. |
| 2002/0025810 A1 | 2/2002 | Takayama et al. |
| 2002/0029260 A1 | 3/2002 | Dobbins et al. |
| 2002/0060986 A1 | 5/2002 | Fukushima et al. |
| 2002/0097679 A1 | 7/2002 | Berenbaum |
| 2002/0107023 A1 | 8/2002 | Chari et al. |
| 2002/0114303 A1 | 8/2002 | Crosbie et al. |
| 2002/0122411 A1 | 9/2002 | Zimmerman et al. |
| 2002/0124177 A1 | 9/2002 | Harper et al. |
| 2002/0133622 A1 | 9/2002 | Pinto |
| 2002/0137462 A1 | 9/2002 | Rankin |
| 2002/0141417 A1 | 10/2002 | Umayabashi |
| 2003/0012166 A1 | 1/2003 | Benveniste |
| 2003/0018812 A1 | 1/2003 | Lakshminarayana et al. |
| 2003/0048183 A1 | 3/2003 | Vollmer et al. |
| 2003/0067892 A1 | 4/2003 | Beyer et al. |
| 2003/0086437 A1 | 5/2003 | Benveniste |
| 2003/0095551 A1 | 5/2003 | Gotoh et al. |
| 2003/0137993 A1 | 7/2003 | Odman |
| 2003/0193959 A1 | 10/2003 | Lui et al. |
| 2003/0224784 A1 | 12/2003 | Hunt et al. |
| 2003/0228846 A1 | 12/2003 | Berliner et al. |
| 2003/0229783 A1 | 12/2003 | Hardt |
| 2004/0047319 A1 | 3/2004 | Elg |
| 2004/0070912 A1 | 4/2004 | Kopp |
| 2004/0081089 A1 | 4/2004 | Ayyagari et al. |
| 2004/0090982 A1 | 5/2004 | Xu |
| 2004/0128310 A1 | 7/2004 | Zmudzinski et al. |
| 2004/0165532 A1 | 8/2004 | Poor et al. |
| 2004/0174829 A1* | 9/2004 | Ayyagari ................ 370/254 |
| 2004/0190542 A1 | 9/2004 | Ono et al. |
| 2004/0210630 A1 | 10/2004 | Simonnet et al. |
| 2004/0218577 A1 | 11/2004 | Nguyen et al. |
| 2004/0234073 A1 | 11/2004 | Sato et al. |
| 2004/0264428 A1 | 12/2004 | Choi et al. |
| 2005/0001694 A1 | 1/2005 | Berkman |
| 2005/0021539 A1 | 1/2005 | Short et al. |
| 2005/0025176 A1 | 2/2005 | Ko et al. |
| 2005/0068227 A1 | 3/2005 | Caspi et al. |
| 2005/0071631 A1 | 3/2005 | Langer |
| 2005/0089005 A1 | 4/2005 | Sakoda et al. |
| 2005/0114489 A1 | 5/2005 | Yonge, III |
| 2005/0117515 A1 | 6/2005 | Miyake |
| 2005/0117750 A1 | 6/2005 | Rekimoto |
| 2005/0135291 A1 | 6/2005 | Ketchum et al. |
| 2005/0147075 A1 | 7/2005 | Terry |
| 2005/0169222 A1 | 8/2005 | Ayyagari et al. |
| 2005/0190785 A1 | 9/2005 | Yonge, III |
| 2005/0192037 A1* | 9/2005 | Nanda et al. ................ 455/509 |
| 2005/0210157 A1 | 9/2005 | Sakoda |
| 2005/0243765 A1 | 11/2005 | Schrader et al. |
| 2005/0249186 A1 | 11/2005 | Kelsey et al. |
| 2006/0002406 A1 | 1/2006 | Ishihara et al. |
| 2006/0039371 A1 | 2/2006 | Castro et al. |
| 2006/0072517 A1 | 4/2006 | Barrow et al. |
| 2006/0077997 A1 | 4/2006 | Yamaguchi et al. |
| 2006/0104301 A1 | 5/2006 | Beyer et al. |
| 2006/0120371 A1* | 6/2006 | Huang et al. ................ 370/392 |
| 2006/0159260 A1 | 7/2006 | Pereira et al. |
| 2006/0168647 A1 | 7/2006 | Chiloyan |
| 2006/0224813 A1 | 10/2006 | Rooholamini et al. |
| 2006/0251017 A1 | 11/2006 | Bishop |
| 2006/0251021 A1 | 11/2006 | Nakano et al. |
| 2006/0252378 A1 | 11/2006 | Bishop |

(56) References Cited

U.S. PATENT DOCUMENTS

| | | |
|---|---|---|
| 2006/0256741 A1 | 11/2006 | Nozaki |
| 2006/0268746 A1 | 11/2006 | Wijting et al. |
| 2007/0004404 A1 | 1/2007 | Buckley et al. |
| 2007/0019609 A1 | 1/2007 | Anjum |
| 2007/0025244 A1 | 2/2007 | Ayyagari et al. |
| 2007/0025384 A1 | 2/2007 | Ayyagari et al. |
| 2007/0025391 A1 | 2/2007 | Yonge, III |
| 2007/0025398 A1 | 2/2007 | Yonge, III |
| 2007/0026794 A1 | 2/2007 | Ayyagari et al. |
| 2007/0030811 A1 | 2/2007 | Frei et al. |
| 2007/0053520 A1 | 3/2007 | Eckleder |
| 2007/0058661 A1 | 3/2007 | Chow |
| 2007/0058732 A1 | 3/2007 | Riedel et al. |
| 2007/0060141 A1 | 3/2007 | Kangude et al. |
| 2007/0097867 A1 | 5/2007 | Kneckt et al. |
| 2007/0115973 A1 | 5/2007 | Koga et al. |
| 2007/0118730 A1 | 5/2007 | Platt |
| 2007/0133388 A1 | 6/2007 | Lee et al. |
| 2007/0133449 A1 | 6/2007 | Schacht et al. |
| 2007/0140185 A1 | 6/2007 | Garg et al. |
| 2007/0147322 A1 | 6/2007 | Agrawal et al. |
| 2007/0183445 A1* | 8/2007 | Kim et al. .............. 370/461 |
| 2007/0189189 A1 | 8/2007 | Andrews et al. |
| 2007/0220570 A1 | 9/2007 | Dawson et al. |
| 2007/0254596 A1 | 11/2007 | Corson et al. |
| 2007/0271398 A1 | 11/2007 | Manchester et al. |
| 2007/0286074 A1 | 12/2007 | Xu |
| 2007/0286111 A1 | 12/2007 | Corson et al. |
| 2008/0002599 A1 | 1/2008 | Yau et al. |
| 2008/0141820 A1 | 6/2008 | Park et al. |
| 2008/0151820 A1 | 6/2008 | Solis et al. |
| 2008/0178003 A1 | 7/2008 | Eastham et al. |
| 2008/0181219 A1 | 7/2008 | Chen et al. |
| 2008/0186230 A1 | 8/2008 | Wengler et al. |
| 2008/0192666 A1 | 8/2008 | Koskan et al. |
| 2008/0212591 A1 | 9/2008 | Wu et al. |
| 2008/0222447 A1 | 9/2008 | Ram et al. |
| 2008/0225774 A1* | 9/2008 | Kim et al. .............. 370/315 |
| 2008/0247408 A1 | 10/2008 | Yoon et al. |
| 2008/0267106 A1 | 10/2008 | Buddhikot et al. |
| 2008/0279126 A1 | 11/2008 | Katar et al. |
| 2008/0279204 A1 | 11/2008 | Pratt, Jr. et al. |
| 2008/0298252 A1 | 12/2008 | Yonge, III |
| 2008/0298589 A1 | 12/2008 | Katar et al. |
| 2008/0298590 A1 | 12/2008 | Katar et al. |
| 2008/0298594 A1 | 12/2008 | Yonge, III |
| 2008/0301052 A1 | 12/2008 | Yonge, III |
| 2008/0301446 A1 | 12/2008 | Yonge, III |
| 2008/0310414 A1 | 12/2008 | Yonge, III |
| 2009/0010276 A1 | 1/2009 | Yonge, III |
| 2009/0011782 A1 | 1/2009 | Yonge, III |
| 2009/0034552 A1 | 2/2009 | Yonge, III |
| 2009/0040930 A1 | 2/2009 | Yonge, III |
| 2009/0067389 A1 | 3/2009 | Lee et al. |
| 2009/0074007 A1 | 3/2009 | Yonge, III |
| 2009/0092075 A1 | 4/2009 | Corson et al. |
| 2009/0097443 A1* | 4/2009 | Pasanen et al. .............. 370/329 |
| 2009/0106551 A1 | 4/2009 | Boren et al. |
| 2009/0116461 A1 | 5/2009 | Yonge, III |
| 2009/0119190 A1 | 5/2009 | Realini |
| 2009/0147714 A1* | 6/2009 | Jain et al. .............. 370/311 |
| 2009/0154487 A1 | 6/2009 | Ryan et al. |
| 2009/0207769 A1 | 8/2009 | Park et al. |
| 2009/0311963 A1 | 12/2009 | Haverty |
| 2010/0014444 A1 | 1/2010 | Ghanadan et al. |
| 2010/0072715 A1 | 3/2010 | Crum |
| 2010/0091760 A1 | 4/2010 | Yoon |
| 2010/0100724 A1 | 4/2010 | Kaliski, Jr. |
| 2010/0161972 A1 | 6/2010 | Staring et al. |
| 2012/0072715 A1 | 3/2012 | Yonge, III |
| 2013/0287041 A1 | 10/2013 | Yonge, III et al. |

FOREIGN PATENT DOCUMENTS

| | | |
|---|---|---|
| EP | 1179919 | 7/2010 |
| JP | 3107317 A | 5/1991 |
| JP | 2002135177 A | 5/2002 |
| JP | 2005073240 A | 3/2005 |
| WO | 9634329 A1 | 10/1996 |
| WO | 9857439 A1 | 12/1998 |
| WO | 02103943 A1 | 12/2002 |
| WO | 03010096 | 2/2003 |
| WO | 03100996 A2 | 12/2003 |
| WO | 2004038980 A2 | 5/2004 |

OTHER PUBLICATIONS

U.S. Appl. No. 11/971,446 Office Action, Feb. 14, 2014 , 19 pages.
U.S. Appl. No. 13/873,168 Office Action, Dec. 16, 2013 , 23 pages.
U.S. Appl. No. 11/970,339 Office Action, May 22, 2014 , 18 pages.
U.S. Appl. No. 12/133,301 Final Office Action, Apr. 17, 2014 , 28 pages.
U.S. Appl. No. 13/873,168 Final Office Action, Jun. 11, 2014 , 22 pages.
U.S. Appl. No. 12/133,315 Office Action, Aug. 9, 2012 , 37 pages.
U.S. Appl. No. 12/133,325 Final Office Action, Dec. 9, 2010 , 33 pages.
U.S. Appl. No. 12/133,325 Office Action, May 27, 2010 , 31 pages.
U.S. Appl. No. 13/113,474 Office Action, Jun. 17, 2013 , 10 pages.
U.S. Appl. No. 13/303,913 Office Action, Dec. 26, 2012 , 37 pages.
U.S. Appl. No. 12/133,301 Office Action, Sep. 25, 2013 , 44 pages.
Afkhamie et al., "An Overview of the upcoming HomePlug AV Standard", May 2005, IEEE 0-7803-8844-5/05. pp. 400-404.
Co-pending U.S. Appl. No. 13/113,474, filed May 23, 2011, 32 pages.
Co-pending U.S. Appl. No. 13/873,168, filed Apr. 29, 2013, 20 pages.
European Search Repor—EP09178487, Search Authority , Munich Patent Office, Jan. 21, 2010.
Faure, Jean-Philippe et al., Call for Submissions. Draft Standard for Broadband over Power Line Networks: Medium Access Control and Physical Layer Specifications. Feb. 14, 2007, 4 pages.
Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.
HomePlug Powerline Alliance Inc., "HomePlug AV White Paper," Doc. Ver. No. HPAVWP-050818, Aug. 2005, pp. 1-11.
International Search Report and Written Opinion—PCT/US2008/065811, International Searching Authority, European Patent Office, Nov. 25, 2008.
International Search Report and Written Opinion—PCT/US2008/065831, International Searching Authority, European Patent Office, Feb. 20, 2009, 22 pages.
Katar et al., "Beacon Schedule Persistence to Mitigate Beacon Loss in HomePlug AV Networks," May 2006, IEEE 1-4244-0113-05/06, pp. 184-188.
Loh et al, Quality of Support and priority Management in HomePNA 2.0 Link Layer, IEEE, 6 pages, 2003.
Muir A., et al., "An Efficient Packet Sensing MAC Protocol for Wireless Networks", Computer Engineering Department School of Engineering, University of California, Aug. 1998, pp. 20.
Opera Specification—Part 1: Technology, Open PLC European Research Alliance, 198 pages, 1006.
Co-pending U.S. Appl. No. 13/933,924, filed Jul. 2, 2013, 36 pages.
"Notification of First Office Action", The State Intellectual Property Office of the People's Republic of China Issued in Chinese Application No. 200610107587.1 Oct. 11, 2010, 6 pages.
"Notification of First Office Action, The State Intellectual Property Office of the People's Republic of China, issued in Chinese Application No. 200880100486.9", Nov. 21, 2012, 17 pages.
"Notification of Reasons for Rejection", Japanese Patent Office Issued in Japanese Patent Application No. 2006-205200 Jan. 18, 2011, 3 pages.
U.S. Appl. No. 11/970,271 Final Office Action, Jul. 19, 2011 , 21 pages.
U.S. Appl. No. 11/970,271 Office Action, Mar. 9, 2012 , 19 pages.

(56) References Cited

OTHER PUBLICATIONS

U.S. Appl. No. 11/970,271 Office Action, Oct. 7, 2011, 20 pages.
U.S. Appl. No. 11/970,271 Office Action, Dec. 7, 2010, 21 pages.
U.S. Appl. No. 11/970,297 Final Office Action, Apr. 16, 2012, 32 pages.
U.S. Appl. No. 11/970,297 Office Action, Mar. 30, 2011, 30 pages.
U.S. Appl. No. 11/970,297 Office Action, Sep. 29, 2011, 31 pages.
U.S. Appl. No. 11/970,323 Office Action, Dec. 7, 2010, 12 pages.
U.S. Appl. No. 11/970,339 Office Action, Jun. 27, 2013, 22 pages.
U.S. Appl. No. 11/970,339 Final Office Action, Jul. 7, 2011, 14 pages.
U.S. Appl. No. 11/970,339 Final Office Action, Dec. 11, 2012, 25 pages.
U.S. Appl. No. 11/970,339 Office Action, Jan. 19, 2011, 22 pages.
U.S. Appl. No. 11/970,339 Office Action, Jun. 18, 2012, 26 pages.
U.S. Appl. No. 11/971,446 Final Office Action, Jul. 1, 2011, 17 pages.
U.S. Appl. No. 11/971,446 Office Action, Feb. 15, 2011, 20 pages.
U.S. Appl. No. 12/108,334 Final Office Action, Jun. 14, 2011, 28 pages.
U.S. Appl. No. 12/108,334 Office Action, Aug. 3, 2012, 18 pages.
U.S. Appl. No. 12/108,334 Office Action, Aug. 3, 2010, 20 pages.
U.S. Appl. No. 12/108,334 Office Action, Feb. 16, 2011, 26 pages.
U.S. Appl. No. 12/133,270 Final Office Action, Nov. 18, 2011, 23 pages.
U.S. Appl. No. 12/133,270 Office Action, Jun. 3, 2011, 67 pages.
U.S. Appl. No. 12/133,301 Final Office Action, Mar. 22, 2011, 39 pages.
U.S. Appl. No. 12/133,301 Final Office Action, Sep. 26, 2012, 54 pages.
U.S. Appl. No. 12/133,301 Office Action, Mar. 1, 2012, 38 pages.
U.S. Appl. No. 12/133,301 Office Action, Sep. 22, 2010, 42 pages.
U.S. Appl. No. 12/133,312 Final Office Action, Feb. 16, 2011, 24 pages.
U.S. Appl. No. 12/133,312 Office Action, Jun. 8, 2011, 24 pages.
U.S. Appl. No. 12/133,312 Office Action, Jul. 28, 2010, 29 pages.
U.S. Appl. No. 12/133,315 Final Office Action, Jul. 20, 2010, 30 pages.
U.S. Appl. No. 12/133,315 Final Office Action, Jun. 9, 2011, 38 pages.
U.S. Appl. No. 12/133,315 Office Action, Dec. 24, 2009, 28 pages.
U.S. Appl. No. 12/133,315 Office Action, Dec. 28, 2010, 36 pages.
U.S. Appl. No. 11/970,297 Office Action, Jan. 21, 2015, 38 pages.
Yonge, III, et al., "Managing Communications Over a Shared Medium", Co-pending U.S. Appl. No. 13/933,924, filed Jul. 2, 2013, 36 pages, Sep. 18, 2013, 36 pages.
U.S. Appl. No. 11/970,339 Final Office Action, Nov. 6, 2014, 24 pages.
U.S. Appl. No. 11/971,446 Final Office Action, Aug. 27, 2014, 21 pages.
U.S. Appl. No. 12/133,301 Office Action, Oct. 2, 2014, 34 pages.
U.S. Appl. No. 13/303,913 Final Office Action, Sep. 16, 2014, 8 pages.
Lee, et al., "HomePlug 1.0 Powerline Communication LANs—Protocol Description and Performance Results", International Journal of Communciation Systems, 2003, 27 pages.
U.S. Appl. No. 12/133,301 Final Office Action, Mar. 16, 2015, 36 pages.
U.S. Appl. No. 13/933,924 Office Action, Jun. 12, 2015, 18 pages.
"U.S. Appl. No. 12/133,301 Office Action", Jul. 1, 2015, 37 pages.

* cited by examiner

US 9,148,385 B2

CONTENTION GROUPS FOR HIDDEN NODES

CROSS-REFERENCE TO RELATED APPLICATIONS

This application is a continuation of U.S. application Ser. No. 12/133,315, entitled "CONTENTION GROUPS FOR HIDDEN NODES," filed on Jun. 4, 2008, which claims priority to U.S. Provisional Application Ser. No. 60/941,949, entitled "MANAGING COMMUNICATIONS OVER A SHARED MEDIUM," filed on Jun. 4, 2007, both of which are incorporated herein by reference.

BACKGROUND

Embodiments of the inventive subject matter generally relate to the field of communications systems, and, more particularly, to managing contention groups for hidden nodes.

A network of communication stations can share a communication medium (e.g., wires connecting multiple stations or spectrum for transmitting radio signals among stations) using any of a variety of access techniques. Some access techniques (e.g., carrier sense multiple access (CSMA) techniques) include a contention period in which stations contend for use of the medium for transmitting a signal by sensing when the medium is idle. In CSMA techniques, "collisions" sometimes occur when signals from two or more stations overlap. Some CSMA techniques attempt to detect collisions and abort transmission to reduce the negative impact of collisions (e.g., CSMA/CD techniques). Other CSMA techniques include mechanisms to avoid or reduce the probability of collisions (e.g., CSMA/CA techniques). For example, different transmissions may be assigned one of multiple priorities. Access is granted using a Priority Resolution Period in which stations signal the priority at which they intend to transmit, and only the highest priority transmissions are allowed to continue in the contention process. A random backoff mechanism spreads the time over which stations attempt to transmit, thereby reducing the probability of collision.

SUMMARY

In one aspect, in general, a method for communicating among stations in a network includes, from each of multiple stations in the network, transmitting information indicating which other stations from which that station is able to reliably receive transmissions. The method includes determining a schedule for communicating among the stations based on the information from the stations and transmitting the schedule over the network. The schedule includes a plurality of time slots during which respective sets of stations are assigned to communicate using a contention-based protocol.

Aspects can include one or more of the following features.

Each station in a given set is able to reliably receive transmissions from all the other stations in the given set.

The contention-based protocol does not use Request to Send/Clear To Send (RTS/CTS) transmissions among the stations in a given set.

At least some of the sets include one or more stations that are not able to reliably receive transmissions from at least some other stations in the same set.

The contention-based protocol used by at least some of the sets that include one or more stations that are not able to reliably receive transmissions from at least some other stations in the same set use Request to Send/Clear To Send (RTS/CTS) transmissions among the stations in a given set.

At least some of the stations are not able to reliably receive transmissions from at least some of the other stations in the network.

Each station in a given set is able to reliably receive transmissions from all the other stations in the given set.

Each station in a first set of stations assigned to communicate in a given time slot is not able to reliably receive transmissions from any of the stations in a second set of stations assigned to communicate in the given time slot.

The contention-based protocol does not use Request to Send/Clear To Send (RTS/CTS) transmissions among the stations in a given set.

At least some of the sets include one or more stations that are not able to reliably receive transmissions from at least some other stations in the same set.

The contention-based protocol used by at least some of the sets that include one or more stations that are not able to reliably receive transmissions from at least some other stations in the same set use Request to Send/Clear To Send (RTS/CTS) transmissions among the stations in a given set.

The information indicating which other stations from which a station is able to reliably receive transmissions is transmitted to a first station.

The first station determines the schedule.

The first station assigns stations to sets based on the information.

The method further comprises providing the stations in different sets one or more parameters associated with the contention-based protocol independently.

The one or more parameters include at least one of a contention window size and a defer counter.

The one or more parameters provided to a given set include at least one parameter that is selected based on the number of stations in the given set.

The one or more parameters provided to a given set include a random backoff parameter.

The contention-based protocol comprises a carrier sense multiple access (CSMA) protocol.

The CSMA protocol comprises a carrier sense multiple access with collision avoidance (CSMA/CA) protocol.

In another aspect, in general, a method for communicating among stations in a network includes assigning a first station to a first level; assigning stations not assigned to a preceding level that can reliably receive transmissions from a preceding level to a higher level; assigning stations to sets based on the assigned level; and determining a schedule for communicating among the stations and transmitting the schedule over the network. The schedule includes a plurality of time slots during which respective sets of stations are assigned to communicate using a contention-based protocol.

Aspects can include one or more of the following features.

At least some of the stations are not able to reliably receive transmissions from at least some of the other stations in the network.

Each station in a given set is able to reliably receive transmissions from all the other stations in the given set.

Each station in a first set of stations assigned to communicate in a given time slot is not able to reliably receive transmissions from any of the stations in a second set of stations assigned to communicate in the given time slot.

The contention-based protocol does not use Request to Send/Clear To Send (RTS/CTS) transmissions among the stations in a given set.

At least some of the sets include one or more stations that are not able to reliably receive transmissions from at least some other stations in the same set.

The contention-based protocol used by at least some of the sets that include one or more stations that are not able to reliably receive transmissions from at least some other stations in the same set use Request to Send/Clear To Send (RTS/CTS) transmissions among the stations in a given set.

In another aspect, in general, a system for communicating among stations in a network includes a first set of multiple stations assigned to communicate during a first time slot using a contention-based protocol; a second set of multiple stations assigned to communicate during a second time slot using a contention-based protocol; and a third set of multiple stations assigned to communicate during the first time slot using a contention-based protocol. At least one station in the first set is able to reliably communicate with at least one station in the second set, and none of the stations in the first set is able to reliably communicate with any of the stations in the third set.

Aspects can include one or more of the following features.

Each of multiple stations in the network is configured to transmit information indicating which other stations from which that station is able to reliably receive transmissions.

At least one station in the network is configured to determine a schedule for communicating among the stations based on the information from the stations and to transmit the schedule over the network.

The schedule includes the first and second time slots.

Among the many advantages of the invention (some of which may be achieved only in some of its various aspects and implementations) are the following.

The approaches described can improve network efficiency. For example, inefficiencies due to hidden nodes can be reduced by reducing or eliminating hidden nodes, and by trading off the number of contention groups and the reduction in hidden nodes. Contention groups can be assigned to time slots such that network communication resources can be reused efficiently. Beacon transmissions can be used to simplify assignment of contention groups and facilitate distributed protocols for forming the groups.

Other aspects and advantages will be apparent from the detailed description, drawings, appendices and claims.

DESCRIPTION OF EMBODIMENT(S)

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
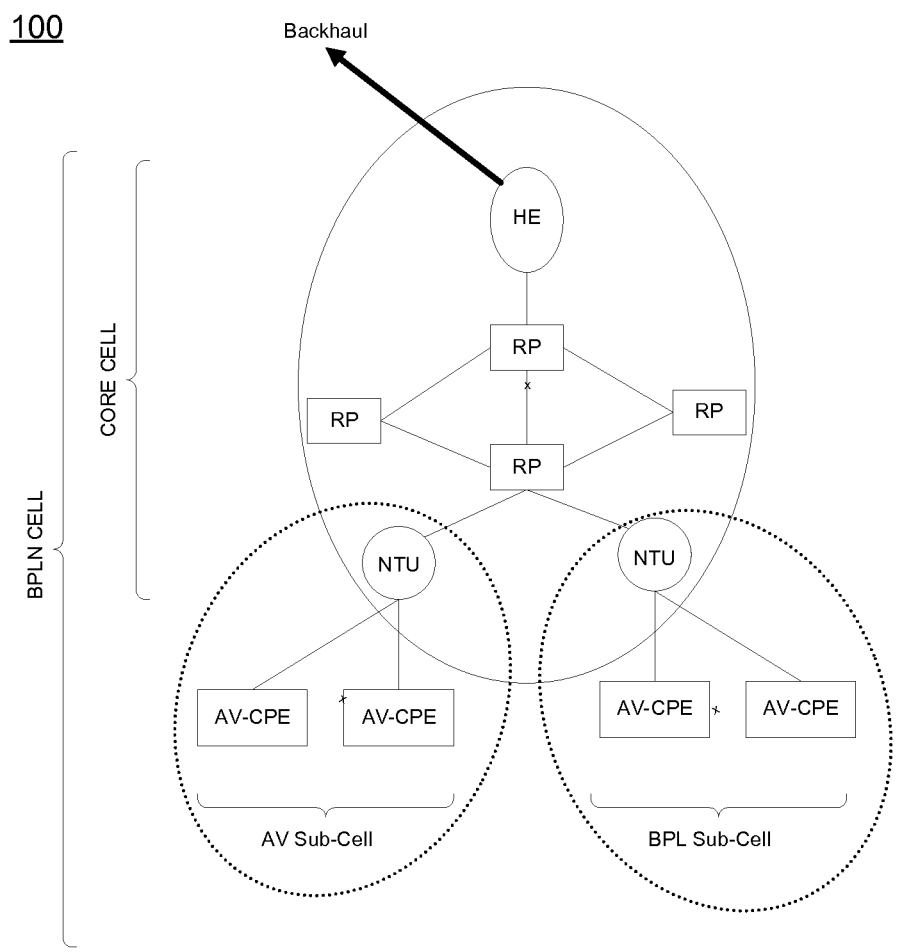
FIG. 1 is a schematic diagram of a communication network.

FIG. 1 shows an exemplary network configuration for an access network 100 such as a Broadband Power Line Network (BPLN) that provides access to a backhaul network. A BPLN can be managed by a service provider entity having access to the underlying physical power line medium. A BPLN is a general purpose network that can be used for several types of applications including, smart grid management, broadband internet access, voice and video delivery services, etc. In various implementations, a BPLN can be deployed on low voltage, medium voltage and high voltage power lines. Additionally, a BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more Cells. A cell is a group of broadband power line (BPL) devices in a BPLN that have similar characteristics such as association management, security, Quality of Service (QoS) and channel access settings, for example. Cells in a BPLN are logically isolated from each other, and communication to and from the backhaul occurs within the cell. Each cell in a BPLN includes a Core-Cell and may also include one or more Sub-Cells. There can be more than one cell on a given physical power line medium.

A Core-Cell includes a group of devices in a BPLN that can share certain functionality such as a common security protocol. An exemplary Core-Cell includes a Head End (HE), Repeaters (R), and Network Termination Units (NTUs), but may exclude Customer Premise Equipment (CPE). The Head End (HE) is a device that bridges a cell to the backhaul network. At a given time, a cell will have one active Head End and the Head End manages the cell including the Core-Cell and any associated Sub-Cells. A Repeater (RP) is a device that selectively retransmits MSDUs to extend the effective range and bandwidth of the BPLN Cell. Repeaters can also perform routing and QoS functions. The NTU is a device that connects a BPLN cell to the end users' network or devices. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single device may be designed to perform multiple functions. For example, a single device can simultaneously be programmed to perform the tasks associated with an RP and an NTU.

Various types of CPE devices (e.g., a computer) can be used as endpoint nodes in the network and such devices can communicate with other nodes in the network through the NTU, any number of repeaters, (e.g., including no repeaters), and the Head End. Each node in the network communicates as a communication "station" using a PHY layer protocol that is used by the nodes to send transmissions to any other stations that are close enough to successfully receive the transmissions. Stations that cannot directly communicate with each other use one or more repeater stations to communicate with each other. The stations have the potential to interfere with each other, but techniques can be used to coordinate in a centralized and/or distributed manner.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code like Viterbi codes, Reed-Solomon codes, concatenated code, turbo codes, low density parity check code, etc., can be employed by the PHY to overcome errors.

One implementation of the PHY layers is to use OFDM modulation. In OFDM modulation, data are transmitted in the form of OFDM "symbols." Each symbol has a predetermined time duration or symbol time Ts. Each symbol is generated from a superposition of N sinusoidal carrier waveforms that are orthogonal to each other and form the OFDM carriers. Each carrier has a peak frequency fi and a phase $\Phi_i$ measured from the beginning of the symbol. For each of these mutually orthogonal carriers, a whole number of periods of the sinusoidal waveform is contained within the symbol time Ts. Equivalently, each carrier frequency is an integral multiple of a frequency interval $\Delta f=1/Ts$. The phases $\Phi_i$ and amplitudes Ai of the carrier waveforms can be independently selected (according to an appropriate modulation scheme) without affecting the orthogonality of the resulting modulated waveforms. The carriers occupy a frequency range between frequencies f1 and fN referred to as the OFDM bandwidth.

Figure 2:
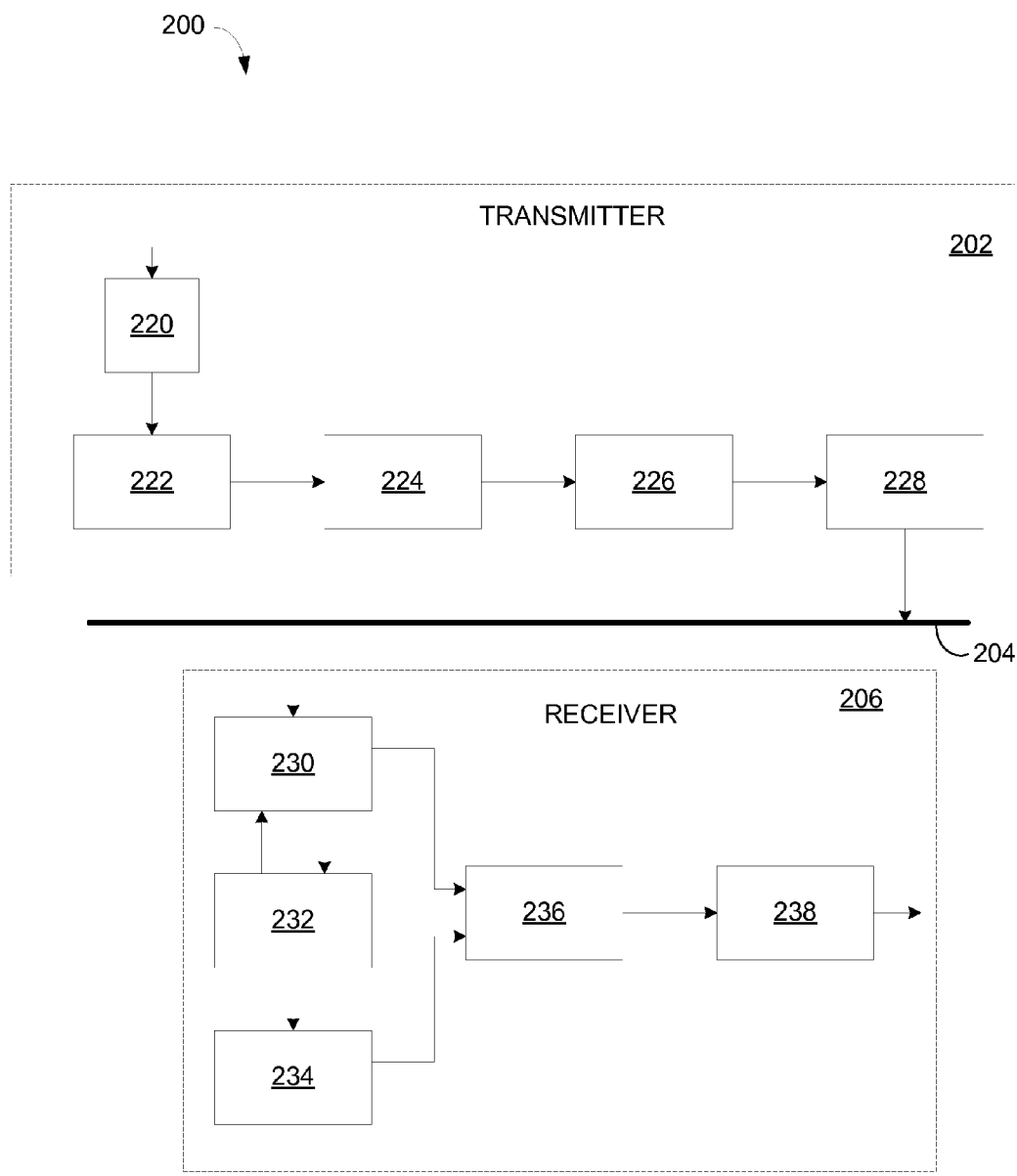
FIG. 2 is a block diagram of a communication system for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency fi. Alternatively, any appropriate modulation scheme that associates data values to modulated carrier waveforms can be used.

The mapping module 222 also determines which of the carrier frequencies F1, . . . , fN within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., A10=0). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies f1, . . . , fN. The modulated carriers are combined by IDFT module 224 to form a discrete time symbol waveform S(n) (for a sampling rate fR), which can be written as $$S(n) = \sum_{i=1}^{N} A_i \exp[j(2\pi i n/N + \Phi_i)] \qquad \text{Eq. (1)}$$

where the time index n goes from 1 to N, Ai is the amplitude and $\Phi_i$ is the phase of the carrier with peak frequency fi=(i/N) fR, and j=√−1. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function $g(\tau;t)$ representing an impulse response of transmission over the communication medium. The communication medium 204 may add noise n(t), which may be random noise and/or narrow-band noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Various stations in a network may generate regular beacon transmissions for various purposes. A beacon transmission (or simply a "beacon") includes management information that can be used for a variety of purposes. The stations may communicate with each other in time periods between beacon transmissions, provided the power line channel characteristics between any two communicating stations permit it.

In some networks one of the functions of a beacon transmission is to carry medium allocation (or scheduling) information. The scheduling information allocates some of the time between beacon transmissions as a contention period during which stations may contend for access to the power line medium. The scheduling information also allocates a contention-free period during which times slots are assigned to particular stations for access to the power line medium. The scheduling information is provided relative to a TDMA Scheduling Period Start Time (or TDMA Period Start Time).

The TDMA Period start time is synchronized with respect to the AC line cycle of the power line waveform such that the time between consecutive TDMA period start times is based on the underlying AC line cycle frequency. Thus, to the extent that the AC line cycle frequency may vary, the TDMA period start time (and hence the duration of each TDMA Period) may not be perfectly periodic. Since the beacons transmitted by the HE may not be heard by every station, each station transmits its own beacon to relay the information in the beacon to stations that do not hear the HE. While the stations may transmit their beacons at different times, the TDMA period start time is established with respect to the information contained in the beacons transmitted by the HE. At each station, the TDMA period start time can be synchronized to that of the HE using a start time synchronization procedure described in more detail below. Each station can then predict a given TDMA period end time (or future TDMA period start time) based on the synchronized start time and the local AC line cycle at the given station by correlating the synchronized start time to a detectable feature of the power line waveform such as a zero crossing. The TDMA period can be set by the HE to any multiple of a half of the AC line cycle period, for example, by waiting for a given number of zero crossings.

In some cases it is desirable to increase the TDMA period to make more efficient use of the medium by reducing the percentage of time devoted to sending the "overhead" information in the beacon transmission. There is also overhead information associated with transmissions from the stations during each TDMA period. It may also be desirable to keep the TDMA period small enough to provide a desired number of transmission opportunities in a given length of time to reduce the latency. Thus, the TDMA period can be selected according to a trade-off between keeping overhead low and latency between transmission opportunities low. For example, in some implementations the TDMA period is selected to be twice the AC line cycle period. In this case, when operating in power line environments with an AC line cycle frequency of 60 Hz, the TDMA period would be approximately 33.33 msec. When operating in power line environments with an AC line cycle frequency of 50 Hz, the TDMA period would be approximately 40 msec. Variations in the TDMA period may occur due to drift in the AC line cycle frequency. The HE determines the duration of the TDMA period as well as the start time of the TDMA period.

Figure 3A:
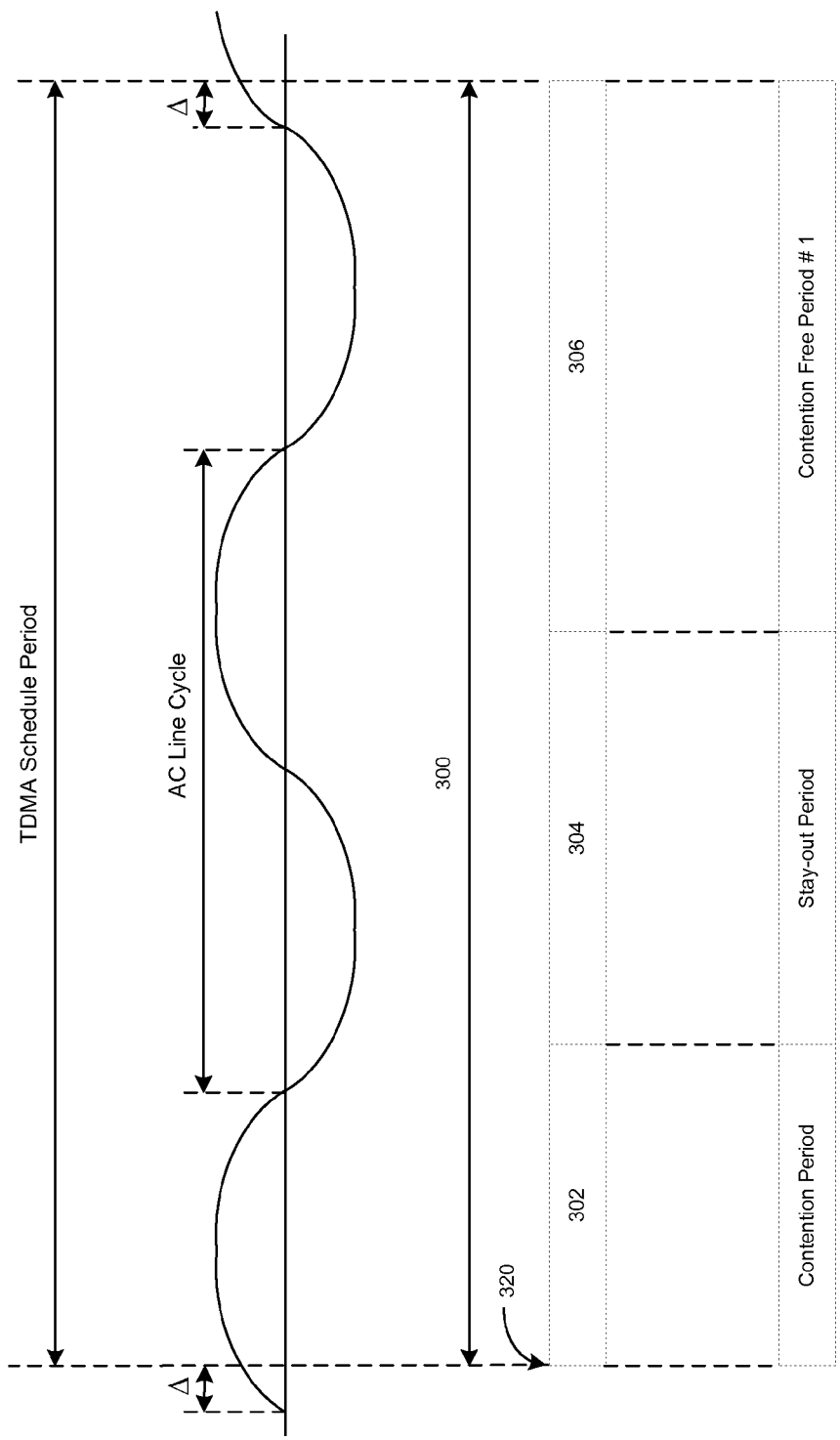
FIGS. 3A and 3B are timing diagrams of a TDMA scheduling period.

FIG. 3A shows the structure of an exemplary TDMA period 300 which consists of a Contention Period 302 followed by a Stay-out Period 304 and a Contention Free Period 306. In general, a TDMA period can contain any number of Contention Periods, Stay-out Periods and Contention Free Periods in any order. The TDMA period may also be different for different stations in the BPLN. The Contention Period 302 is a time in which stations can contend for permission to transmit using a shared medium access protocol such as CSMA/CA. The Stay-out Period 304 is a time during which stations are not allowed to transmit. The Contention Free Period 306 includes time slots assigned for use by predetermined stations (e.g., using a Time Domain Multiple Access (TDMA) protocol). Beacons are typically transmitted during the Contention Period. Beacon may also be transmitted during Contention Free Periods. The frequency of beacon transmission depends on how frequently the associated management information needs to be communicated. Typically, beacons are transmitted once in several TDMA periods.

In networks in which repeaters are used to extend the reach of signals in the network, multiple stations can retransmit beacon transmissions to be heard by stations that would otherwise not be able to receive the beacon transmissions from the HE.

In some implementations, contention occurs over all the stations in the network contending during the contention period 302. However, for large networks, even with the use of random backoff intervals, collisions are more likely to occur (e.g., due to multiple layers of hidden nodes). In some implementations, the stations can be broken into groups that perform contention independently (e.g., in different contention periods) without interfering with each other. Each contention group has a smaller number of stations, and can be selected to reduce or eliminate hidden nodes within each group.

For example, the stations can be assigned to "contention groups" centrally by the HE station based on information collected from the stations about which stations can reliably receive transmissions from which other stations, or in a distributed manner as described in more detail below. Within each contention group, a contention-based protocol (e.g., a CSMA protocol) can be used. Different (potentially overlapping) time slots can be allocated (e.g., as determined by the HE) in which contention-based communication occurs based on knowledge of traffic conditions and of routing and network topology. These contention groups can reduce inefficiencies associated with using a contention-based protocol over the entire network that result, for example, from having multiple layers of hidden stations. If hidden stations exist in a group of contending stations, to avoid collisions, Request To Send/Clear To Send (RTS/CTS) signals can be used. However, these RTS/CTS have associated overhead (e.g., time used to send the signals) that reduce efficiency. In some implementations, stations are assigned to contention groups so that each contention group does not have any hidden stations (i.e., such that all the stations in a given contention group can hear each other). Without hidden stations among the stations in a contention group, the need for using RTS/CTS signals can be eliminated, improving efficiency for each group. In some implementations, as described in more detail below, stations are assigned to contention groups to reduce the layers of hidden stations, while still allowing some hidden nodes to exists in order to reduce the number of contention groups.

Different contention groups can also be assigned different time slots so that stations in neighboring contention groups do not interfere. For example, the time slots can be assigned during the Contention Free Period 306 to ensure that contention occurs between stations assigned to the same contention group without interference from stations assigned to different contention groups. One or more contention groups that do not interfere (e.g., if the contention groups are far enough apart) and are assigned to the same time slot are called a "time slot group." Time slot groups facilitate channel reuse, as explained in more detail below. The contention groups also enable customizing parameters to each contention group based on characteristics of the group, such as the number of stations in the group. Different backoff parameters, for example, can be used. Other parameters that can be customized for each contention group are a contention window size and a defer counter.

Figure 3B:
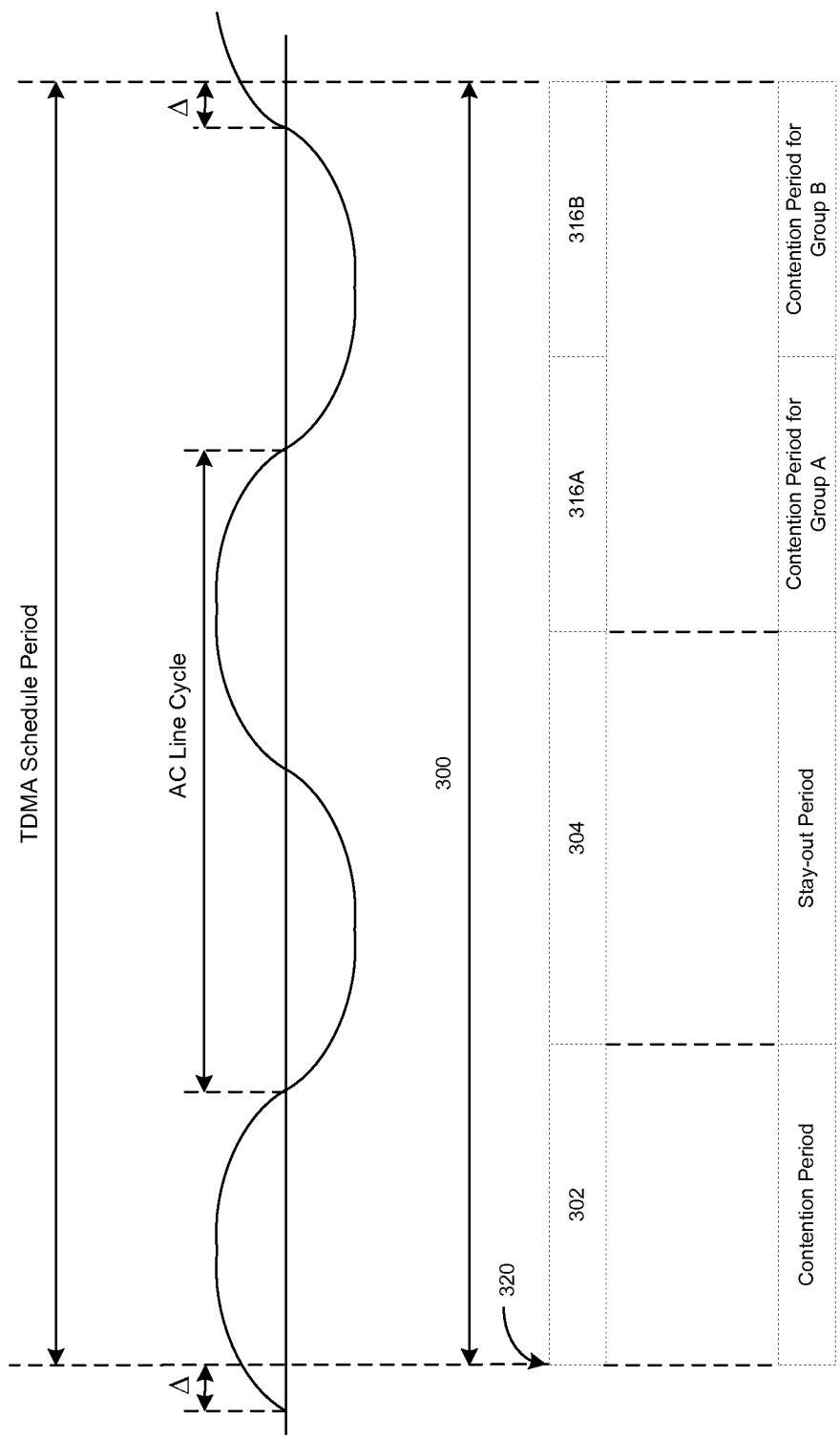
Figure 4A:
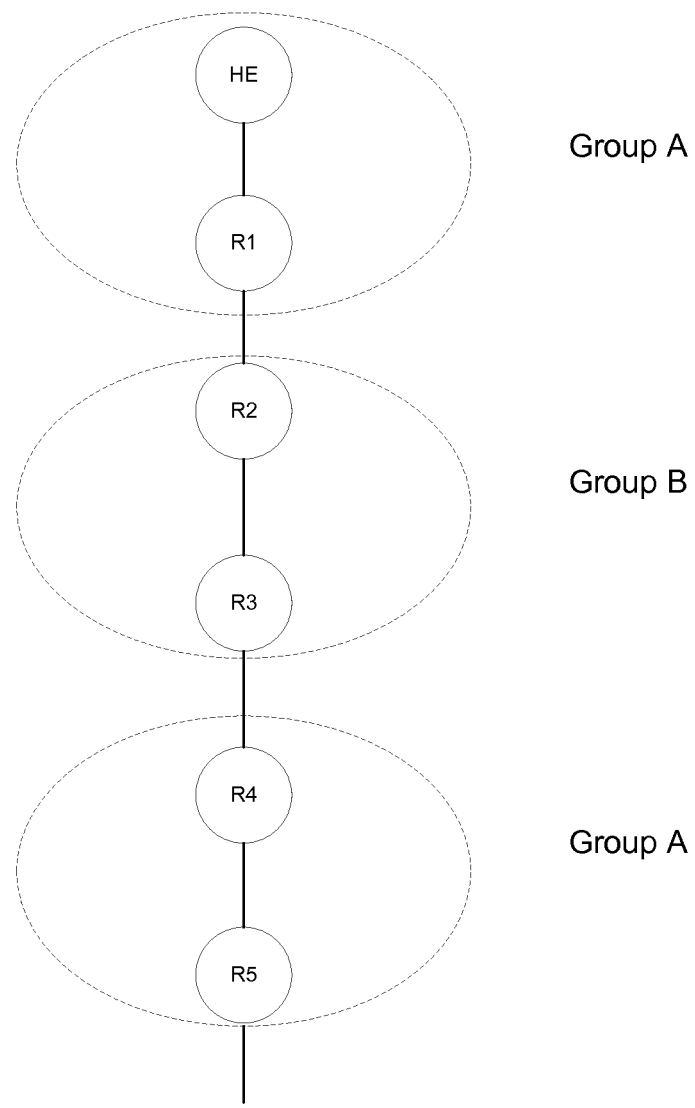
FIGS. 4A-4C and FIG. 6 are schematic diagrams of stations assigned to contention groups and time slot groups.

FIG. 4A shows an example, of an assignment of contention groups and time slot groups in a case in which there is a linear chain of stations including an HE station and repeater stations R1, R2, R3, R4, etc. In FIG. 4A, stations that can hear each other are connected with a line. Thus, HE can hear R1, R1 can hear HE, and R2, and so on. Each station is assigned a position in the chain such that the HE station is in position 0, repeater station R1 is in position 1, repeater station R2 is in position 3, and so on. In this example, in order to eliminate hidden nodes within contention groups and ensure that no contention groups interfere with each other, only two time slots are needed. The stations are divided into contention groups of two and each contention group is assigned to one of two time slot groups (Group A and Group B), starting with HE and R1 in time slot Group A, R2 and R3 in time slot Group B, and R4 and R5 in time slot Group A, and so on (alternating assigning adjacent contention groups to different time slot groups). All stations with a position equal to 4n or 4n+1 (where n=0, 1, 2, ... ) in time slot Group A contend during a first time slot, and all stations with a position equal 4n+2 or 4n+3 (where n=0, 1, 2, ... ) in time slot Group B contend during a second time slot that does not overlap with the first time slot. The start and end times of the time slots for each time slot group can be indicated in a message sent by the HE station and passed on to all stations in the network. FIG. 3B shows the time slot 316A used as a contention period for time slot group A and time slot 316B used as a contention period for time slot group B.

In some network topologies, complete elimination of hidden nodes can result in large number of contention groups. Since more contention groups generally call for more time slots for contention, this reduces the network efficiency. Thus, there is a trade off between the selection of a larger number of contention groups without hidden nodes and a smaller number of contention groups with hidden nodes. In the latter case, a smaller number of contention groups will result in lower efficiency loss due to grouping, however, the need to handle hidden nodes will result in efficiency loss due to collisions and use of RTS/CTS.

Figure 4B:
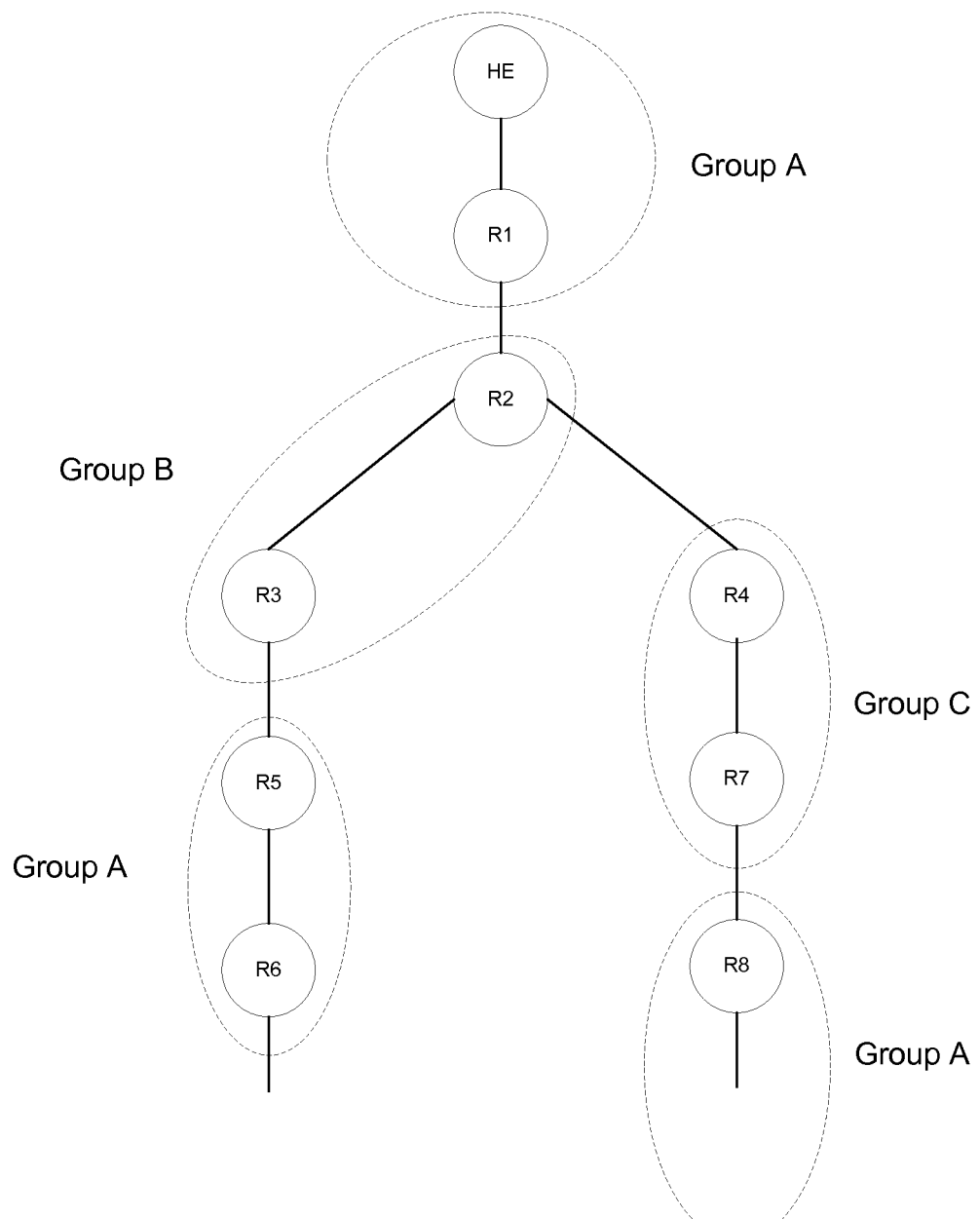
Figure 4C:
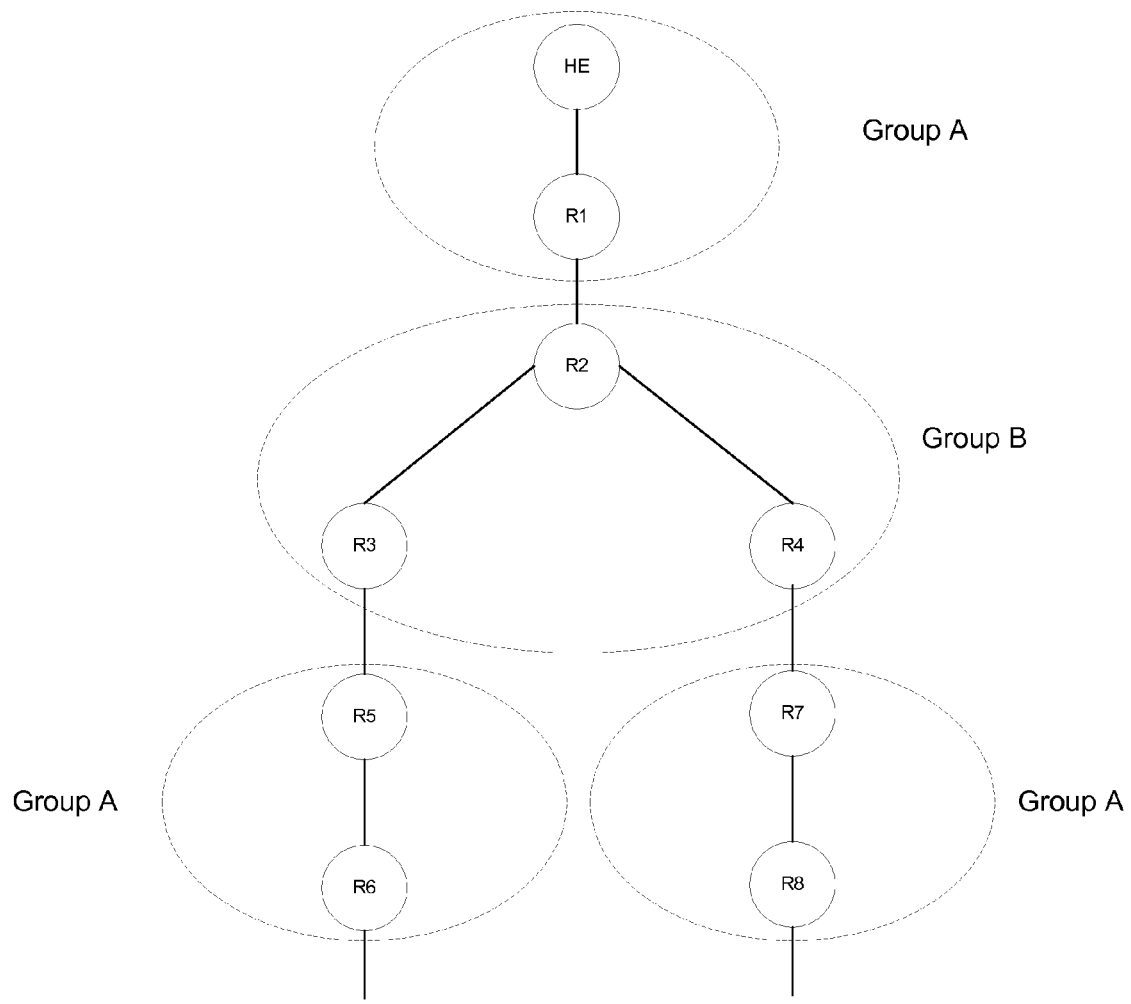

FIG. 4B and FIG. 4C show different groupings of contention groups and assignment to time slot groups for the same network topology. Contention groups are shown with dashed ovals and time slot groups are labeled. In FIG. 4B, the grouping is such that there are no hidden nodes in any of the contention groups. Three separate time slots (for three respective time slot groups) are required to schedule all of these groups so that transmissions by stations in one group do not interfere with the transmissions by stations in another group. FIG. 4C shows another grouping in which only two time slots (for two respective time slot groups) are required to schedule them. However, the single contention group assigned to time slot group B has hidden nodes, and the collisions and the RTS/CTS mechanisms used to address this hidden node problem will result in some efficiency loss. The grouping used in FIG. 4C provides better network efficiency than the grouping used in FIG. 4B. The grouping used in FIG. 4C requires only two time slots, which results in more channel reuse than that used in FIG. 4B.

In some implementations, the HE station can gather information about which stations can hear which other stations and management messages from the HE tell the stations which group they are assigned to. In some implementations, the stations can perform a distributed protocol, to determine which stations can hear each other and select contention groups such that the stations in a given group can hear each other.

Figure 5:
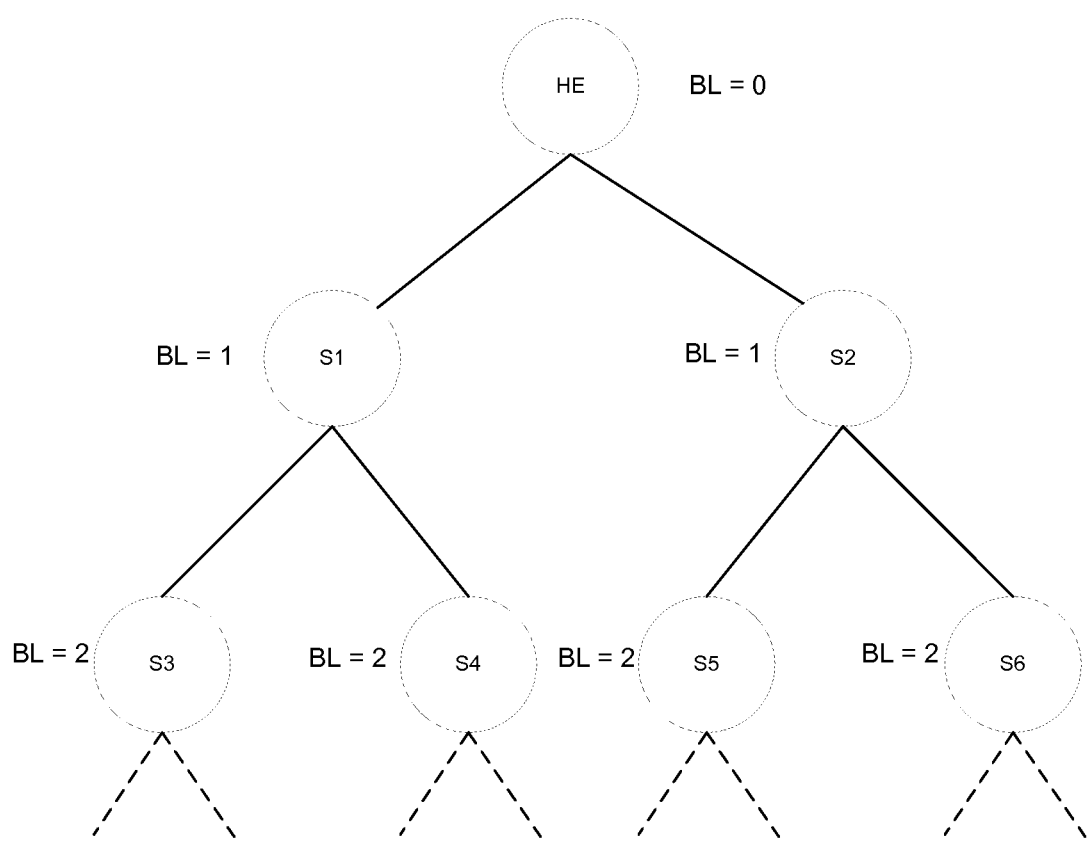
FIG. 5 is a diagram of stations grouped into beacon levels.

Each station in the BPLN broadcasts a beacon transmission regularly but not necessarily at the same time (or at the same frequency) at which the HE broadcasts beacon transmissions. For example, a Repeater station may transmit its beacon within a given target maximum delay (e.g., 100 ms) after reception of the beacon it is tracking The beacon transmission can contain many fields including a Beacon Level (BL) field. The BL is used to determine the hierarchy of stations in the network. The HE is considered to be a Beacon Level 0 station and it sets the BL field in the beacon transmission to be zero. All the stations that can reliably receive (or "hear") the beacon transmissions sent by the HE (with BL=0) are Beacon Level 1 stations and set the BL field in their beacon transmissions to 1. For all other stations, the BL is one higher than the smallest BL of all the stations it can reliably hear. FIG. 5 shows an example of stations grouped into Beacon Levels. A group of stations labeled HE and S1-S6 may be a head end and a group of repeaters in a BPLN, for example. The stations are shown arranged in a graph with a line between stations that represents the ability to reliably receive a beacon transmission. In this example, stations S1 and S2 are Beacon Level 1 stations and S3, S4, S5 and S6 are Beacon Level 2 stations.

Figure 6:
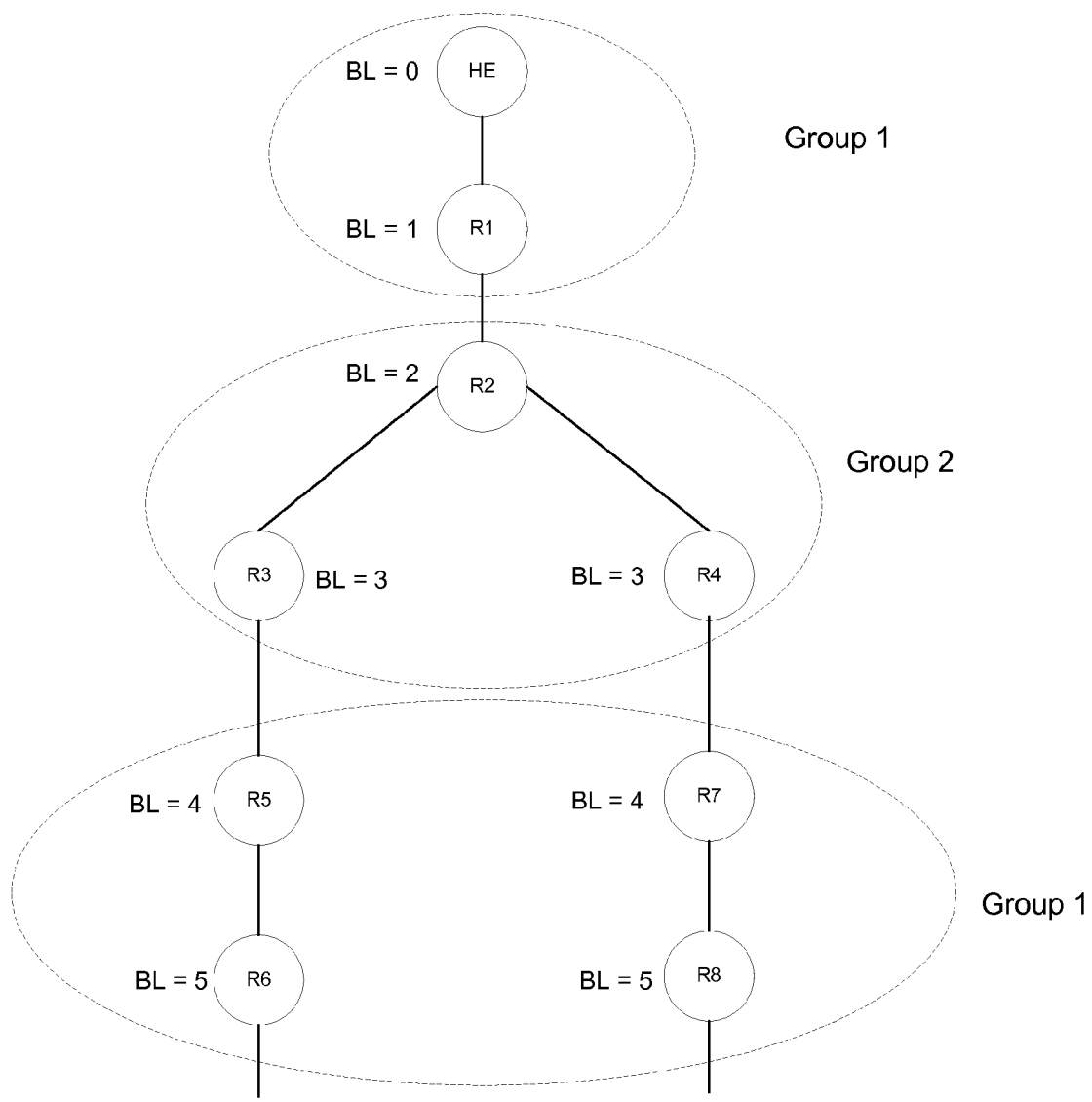

Beacon Level information can be used by stations to determine the contention groups and time slot groups in a distributed manner. For example, contention groups include stations of two consecutive beacon levels, and stations whose beacon levels are {4n, 4n+1} (where n=0, 1, 2, ... ) belong to one time slot group and stations whose beacon levels are {4n+2,4n+3} (where n=0, 1, 2, ... ) will belong to a second time slot group. This grouping will result in a schedule with two time slots. Another grouping could result in requiring three time slots with stations whose beacon levels are {6n,6n+1} (where n=0, 1, 2, ... ) belong to a time slot group scheduled in the first time slot, those with beacon levels {6n+2,6n+3}(where n=0, 1, 2, ... ) belong to a time slot group scheduled in the second time slot and , those with beacon levels {6n+4,6n+5}(where n=0, 1, 2, ... ) belong to a time slot group scheduled in the third time slot. FIG. 6 shows a network with the beacon level of each station shown next to it. Using the beacon level grouping mechanism and considering a schedule of two time slots, stations with beacon levels 0, 1, 4, 5 belong to time slot Group 1 and stations with beacon levels 2, 3 belong to time slot Group 2. Hence stations HE, R1, R5, R6, R7 and R8 belong to time slot Group 1 and stations R2 and R3 belong to time slot Group 2.

Many other implementations of the invention other than those described above are within the invention, which is defined by the following claims.

What is claimed is:

1. A method performed by a first station for communicating in a network, the method comprising:
   identifying, at the first station, beacon levels of stations in the network, the beacon levels indicative of a hierarchy of the stations in the network;
   assigning, at the first station, the stations to contention groups based, at least in part, on the beacon levels, wherein at least one contention group of the contention groups includes stations of two different consecutive beacon levels; and
   determining, at the first station, a communications schedule for the contention groups, wherein neighboring contention groups of the contention groups are scheduled at non-overlapping time slots of the communications schedule.

2. The method of claim 1, wherein identifying the beacon levels comprises:
   collecting information regarding from which other stations a particular station of the stations is capable of reliably receiving transmissions.

3. The method of claim 1, wherein determining the communications schedule comprises determining a time slot group having one or more of contention groups that do not interfere with each other, wherein the one or more contention groups in the time slot group are assigned to a same time slot of the communications schedule.

4. The method of claim 1, wherein each station in a first contention group is capable of reliably receiving transmissions from all other stations in the first contention group.

5. The method of claim 1, wherein each station in a first contention group is assigned to communicate in a first time slot and each station in a second contention group is assigned to communicate in a second time slot.

6. The method of claim 5, wherein each station in a third contention group is assigned to communicate in the first time slot, wherein each station in the first contention group is not able to reliably receive transmissions from stations in the third contention group.

7. The method of claim 1, wherein stations in a first contention group contend with each other to communicate over the network using a contention-based protocol.

8. The method of claim 7, wherein when there are no hidden nodes included in the first contention group, the contention-based protocol does not include Request to Send/Clear To Send (RTS/CTS) transmissions among the stations in the first contention group.

9. The method of claim 7, wherein when the first contention group includes at least one hidden node, the contention-based protocol includes Request to Send/Clear To Send (RTS/CTS) transmissions among the stations in the first contention group.

10. The method of claim 1, further comprising:
    providing, to stations in different contention groups, at least one group-specific parameter associated with a contention-based protocol.

11. The method of claim 10, wherein the at least one group-specific parameter includes at least one member of a group consisting of a contention window size, a defer counter, and a random backoff parameter.

12. The method of claim 10, wherein the at least one group-specific parameter is selected based, at least in part, on a number of stations in each contention group.

13. The method of claim 10, wherein providing the at least one group-specific parameter comprises:
    providing, to stations in a first contention group, a first parameter; and
    providing, to stations in a second contention group, a second parameter, different from the first parameter.

14. The method of claim 1, wherein each respective station has a beacon level that is one level higher than a lowest beacon level of other stations from which the respective station is capable of reliably receiving transmissions.

15. A station for communicating in a network, the station comprising:
    a processor; and
    memory for storing instructions therein which, when executed by the processor, cause the station to:
       identify beacon levels of stations in the network, the beacon levels indicative of a hierarchy of the stations in the network;
       assign the stations to contention groups based, at least in part, on the beacon levels, wherein at least one contention group of the contention groups includes stations of two different consecutive beacon levels; and
       determine a communications schedule for the contention groups, wherein neighboring contention groups of the contention groups are scheduled at non-overlapping time slots of the communications schedule.

16. The station of claim 15, further comprising:
    a receiver configured to collect information indicating from which other stations a particular station is capable of reliably receiving transmissions; and
    a transmitter configured to send transmissions in accordance with the communications schedule for a first contention group.

17. The station of claim 16, wherein the transmitter is configured to transmit scheduling information associated with the communications schedule to at least one other station.

18. The station of claim 16, wherein the transmitter is configured to transmit beacon transmissions via the network.

19. The station of claim 16, wherein the transmitter is configured to transmit, to at least one other station, information regarding from which other stations the station is capable of reliably receiving transmissions.

20. The station of claim 15, wherein the instructions, when executed by the processor, cause the station to:
    provide, to stations in different contention groups, at least one group-specific parameter associated with a contention-based protocol.

21. The station of claim 20, wherein the at least one group-specific parameter includes at least one member of a group consisting of a contention window size, a defer counter, and a random backoff parameter.

22. The station of claim 20, wherein the at least one group-specific parameter is selected based, at least in part, on a number of stations in each contention group.

23. A non-transitory computer readable medium storing computer program code, the computer program code comprising instructions which, when executed by a processor of a station, cause the station to:
    identify beacon levels of stations in a network, the beacon levels indicative of a hierarchy of the stations in the network;
    assign the stations to contention groups of the contention groups based, at least in part, on the beacon levels, wherein at least one contention group includes stations of two different consecutive beacon levels; and
    determine a communications schedule for the contention groups, wherein neighboring contention groups of the content are scheduled at non-overlapping time slots of the communications schedule.

24. The non-transitory computer readable medium of claim 23, wherein the computer program code comprises instructions which, when executed by the processor of the station, cause the station to collect information indicating from which other stations a particular station is capable of reliably receiving transmissions.

25. The non-transitory computer readable medium of claim 23, wherein the instructions that cause the station to determine the communications schedule comprise instructions which, when executed by the processor, cause the station to determine a time slot group having one or more contention groups that do not interfere with each other, wherein the one or more contention groups in the time slot group are assigned to a same time slot of the communications schedule.

26. The non-transitory computer readable medium of claim 23, wherein the computer program code comprises instructions which when executed by the processor of the station cause the station to transmit scheduling information associated with the communications schedule to at least one other station.

27. The non-transitory computer readable medium of claim 23, wherein the computer program code comprises instructions which when executed by the processor of the station cause the station to:
provide, to stations in different contention groups, at least one group-specific parameter associated with a contention-based protocol.

28. The non-transitory computer readable medium of claim 27, wherein the at least one group-specific parameter includes at least one member of a group consisting of a contention window size, a defer counter, and a random backoff parameter.

29. The non-transitory computer readable medium of claim 27, wherein the at least one group-specific parameter is selected based, at least in part, on a number of stations in each contention group.

30. A method performed by a first station for communication in a network, the method comprising:
identify, at the first station in the network, beacon levels of other stations in the network, the beacon levels indicative of a hierarchy of the other stations in the network;
assigning the first station and the other stations of the network to contention groups based, at least in part, on the beacon levels, wherein at least one contention group of the contention groups includes stations of two different consecutive beacon levels;
determining, at the first station, a schedule for each contention group of the contention groups to communicate using the network, wherein the schedule includes a plurality of time slots;
wherein the contention groups and the schedule are coordinated so that stations assigned to a first contention group are scheduled in a first time slot, and stations assigned to a second contention group are scheduled in a second time slot;
wherein the contention groups and the schedule are coordinated so that stations assigned to the first contention group are not capable of reliably receiving transmissions from stations in a third contention group, and wherein the first contention group and the third contention group are scheduled in the first time slot; and
transmitting the schedule over the network to the other stations.

\* \* \* \* \*